United States Patent
Pellarin et al.

(10) Patent No.: US 9,105,179 B2
(45) Date of Patent: *Aug. 11, 2015

(54) COMMUNICATION METHOD IN A HOME-AUTOMATION INSTALLATION

(71) Applicant: Somfy SAS, Cluses (FR)

(72) Inventors: Florent Pellarin, Saint-Martin Bellevue (FR); Barbara Augustin, Taninges (FR)

(73) Assignee: SOMFY SAS, Cluses (FR)

( * ) Notice: Subject to any disclaimer, the term of this patent is extended or adjusted under 35 U.S.C. 154(b) by 225 days.

This patent is subject to a terminal disclaimer.

(21) Appl. No.: 13/793,946

(22) Filed: Mar. 11, 2013

(65) Prior Publication Data

US 2013/0194065 A1    Aug. 1, 2013

Related U.S. Application Data

(63) Continuation-in-part of application No. 11/821,491, filed on Jun. 22, 2007, now Pat. No. 8,532,132.

(30) Foreign Application Priority Data

Jun. 26, 2006 (FR) .................................. 06 05705
Jun. 30, 2006 (FR) .................................. 06 05929

(51) Int. Cl.
*H04L 12/54* (2013.01)
*G08C 19/00* (2006.01)
*H04L 12/12* (2006.01)
*H04L 12/28* (2006.01)

(52) U.S. Cl.
CPC .............. *G08C 19/00* (2013.01); *H04L 12/12* (2013.01); *H04L 12/2832* (2013.01); *H04L 2012/285* (2013.01); *H04L 2012/2841* (2013.01); *Y02B 60/32* (2013.01); *Y02B 60/34* (2013.01)

(58) Field of Classification Search
CPC ....................................................... H04L 12/12
USPC ......................................................... 370/428
See application file for complete search history.

(56) References Cited

U.S. PATENT DOCUMENTS

| 4,803,487 A | 2/1989 | Willard et al. |
| 6,525,645 B2 | 2/2003 | King et al. |
| 7,027,416 B1 | 4/2006 | Kriz |
| 7,181,014 B1 | 2/2007 | Srivastava |
| 7,761,072 B2 | 7/2010 | Fielder et al. |
| 8,532,132 B2 * | 9/2013 | Pellarin et al. ............... 370/428 |
| 2004/0029620 A1 * | 2/2004 | Karaoguz .................... 455/574 |
| 2004/0078154 A1 * | 4/2004 | Hunter ........................... 702/61 |
| 2004/0097268 A1 | 5/2004 | Kurokawa et al. |
| 2006/0017726 A1 * | 1/2006 | Saikawa et al. .............. 345/419 |
| 2006/0025181 A1 | 2/2006 | Kalofonos et al. |
| 2006/0105716 A1 | 5/2006 | Jung et al. |

FOREIGN PATENT DOCUMENTS

| CA | 2 337 118 A | 5/2000 |
| EP | 1 404 043 A | 3/2004 |

(Continued)

*Primary Examiner* — Wei Zhao
(74) *Attorney, Agent, or Firm* — Frommer Lawrence & Haug LLP; Ronald R. Santucci

(57) ABSTRACT

The communication method applies to a home-automation installation comprising at least one sending element, a self-powered receiving element and an element for substituting for the receiving element. The method is such that, when the receiving element is in a sleep mode, the substitution element receives and records information sent by the sending element for the attention of the receiving element and such that, when the receiving element is no longer in sleep mode, the substitution element sends the information for the attention of the receiving element.

22 Claims, 4 Drawing Sheets

(56) References Cited

FOREIGN PATENT DOCUMENTS

| EP | 1 545 076 A | 6/2005 |
|----|-------------|--------|
| JP | 60-236335 A | 11/1985 |
| JP | 2001-102981 A | 4/2001 |
| JP | 2002-077172 A | 3/2002 |
| JP | 2004-172772 A | 6/2004 |
| JP | 2005-027280 A | 1/2005 |
| JP | 2005-072937 A | 3/2005 |
| JP | 2006-033717 A | 2/2006 |

\* cited by examiner

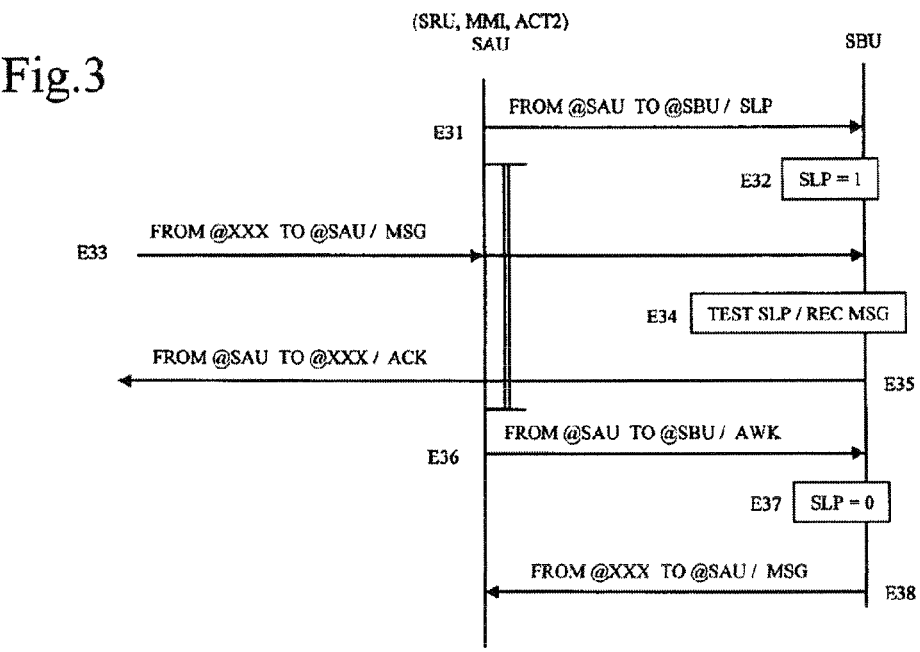
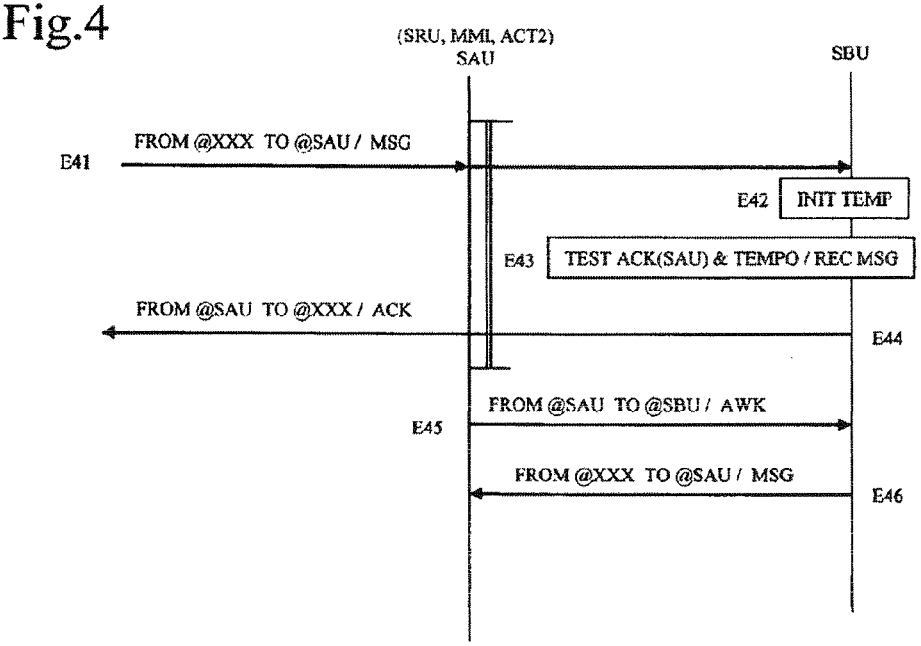

Fig.5

| | |
|---|---|
| Send a configuring mode command to the chosen substitution element with the aid of a device acting on the latter | E51 |
| Action on the autonomous receiving element to cause a radio signal containing the address of the autonomous element to be sent | E52 |
| Recording of the address of the autonomous receiving element by the substitition element and sending by the latter of a message to the autonomous receiving element indicating its own address | E53 |

Fig.6

| | |
|---|---|
| Action on the autonomous receiving element to cause a radio signal containing the address of the autonomous receiving element to be sent | E61 |
| Ranking of the nonautonomous elements or those with high-capacity power supply, according to the power of the signal received | E62 |
| Recording of the address of the autonomous receiving element and sending of its own address by the element that received the strongest signal | E63 |

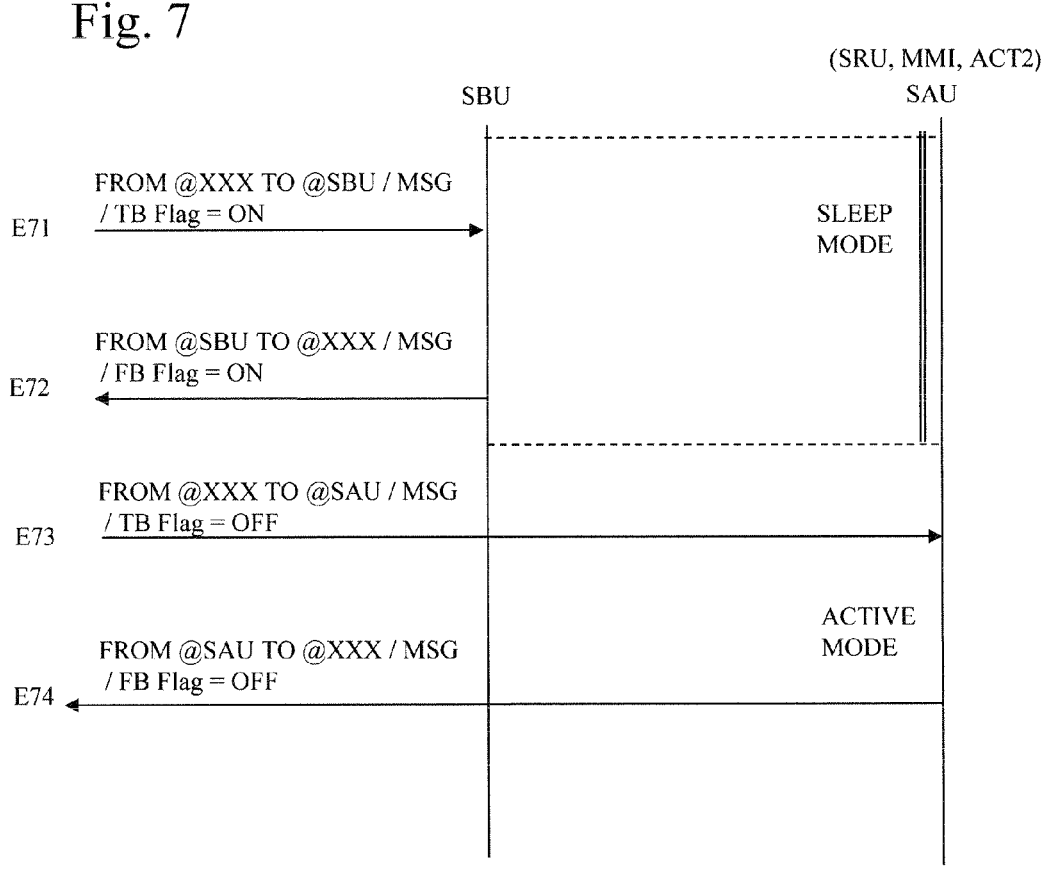

COMMUNICATION METHOD IN A HOME-AUTOMATION INSTALLATION

This application is a continuation-in-part of U.S. application Ser. No. 11/821,491, filed Jun. 22, 2007, and claims priority benefits from French Patent Application No. 06 05705 filed Jun. 26, 2006 and French Patent Application No. 06 05929, filed Jun. 30, 2006, the disclosures of which are hereby incorporated by reference.

BACKGROUND

The invention relates to the transmission of commands or data between elements of a home-automation installation for the attention of self-powered elements. The elements intercommunicate for example by radio-frequencies. They can in particular comprise actuators, sensors and control points.

Actuators are in general powered on the commercial power supply network, while sensors and control points are in general self-powered, for example, powered by dry or rechargeable cells.

A problem arises in such an installation as soon as the self-powered elements are of bidirectional type: how to avoid permanent listening by radio-frequency receivers, the effect of which is to increase consumption and therefore reduce autonomy.

This problem has given rise to numerous inventions.

In a first group of inventions, patent application WO 00/28776 discloses receivers that wake up at a fixed time. It is therefore necessary that they contain at least one clock device which is permanently powered. A similar procedure is described in application EP 1 404 043.

A second group of inventions uses routers, for which the power supply problem does not arise, for example because they are powered on the commercial network, or because they are powered by a large energy reserve.

Patent application EP 1 545 076 describes the use of an automobile as relay of a portable device in a cellular network. Similar uses are found in applications JP59092133 and JP11276343. In a field related to home automation, U.S. Pat. No. 6,525,645 also describes the use of a repeater situated in the automobile and powered by its accumulator. Provided that the identification code is valid, the signal sent by the portable device held by the driver is repeated identically but with a more powerful signal by the repeater.

U.S. Pat. No. 7,027,416 also describes an installation of home-automation type: the self-powered devices each communicate with a router, by means of a low power communication, making it possible to reduce both range and consumption. The routers intercommunicate at higher power and according to different frequency bands, with a different protocol from that used in the low level communication. Communication between two elements requires the use of at least one router, in general several. It is provided that a self-powered element is periodically or randomly deactivated according to a pre-established duty ratio. The router having to communicate with such an element is warned of this manner of operation and takes account thereof to define the transmission instants. It is not provided that elements can intercommunicate directly, this being explained by the hierarchized nature of the network and by the fact that the decisions are taken by a local and/or remote controller, for example via the telephone network. The controller also manages the main routing table, on the basis of knowledge of the local routing tables.

A third group of inventions describes the use of repeaters of "mailbox" type.

U.S. Pat. No. 4,803,487 deals with the case of a pager with remote display means. For example, the main receiver, or first receiver, receives the messages and stores them in memory. It is powered by a battery of high capacity, and nevertheless of an economizer device, prompting sleep over a given time interval if the pager is not the message destination. This main receiver communicates by a possibly bidirectional means with the remote display. The link between the display and the first receiver is carried out with a different protocol from the communication protocol used to transmit the messages to each pager. On activation of a user control, the transmitter of the remote display interrogates the first receiver, which then sends the information contained in memory to the receiver of the remote display.

The prior art devices therefore call upon complex structures supporting several communication means or protocols, or provide a single communication means but with limited performance for portable remote control, the problem then being dealt with from the standpoint of reducing consumption at transmission, and not at reception. A problem arises in particular when the portable remote control is replaced with a sensor that is not easily accessible (and for which it is difficult to replace cells), and still more when the intelligent relay is itself self-powered, or indeed portable.

Furthermore, application US 2006/0025181 discloses an installation comprising a set of elements communicating over a network. One of the elements can moreover communicate with a self-powered terminal that does not form part of the network. This self-powered terminal operates according to an alternating cycle of wakeup and sleep phases so as to optimize its autonomy. Thus, in the case where the element of the network wants to transmit data to the terminal while the latter is in a sleep phase, this network element must store the data in memory and wait for a self-powered terminal wakeup information before actually sending it the data. In this installation, the terminal's possibilities of communication with the elements of the network are very limited: it can only communicate, both in transmission and in reception, with a single element.

SUMMARY OF THE DISCLOSURE

The aim of the invention is to provide a communication method making it possible to obviate the drawbacks cited and to improve the communication methods known from the prior art. In particular, the communication method according to the invention makes it possible to minimize the energy consumption due to communication of the self-powered elements of a home-automation installation organized as a network of home-automation elements and in particular to minimize the energy consumed outside of the signal sending phases.

The communication method applies to a home-automation installation comprising at least one sending element, a self-powered receiving element and an element for substituting for the receiving element. The sending element, the receiving element and the substitution element belong to one and the same network. The method is such that, when the receiving element is in a sleep mode, the substitution element receives and records information sent by the sending element for the attention of the receiving element and such that, when the receiving element is no longer in sleep mode, the substitution element sends the information for the attention of the receiving element.

When the receiving element is not in sleep mode, the information is transmitted directly between the sending element and the receiving element.

When the receiving element is in sleep mode, following receipt of the information, the substitution element can confirm to the sending element that it has been properly received by substituting the identifier of the receiving element for the identifier of the substitution element.

The substitution element can receive and record information sent by the sending element for the attention of the receiving element only after the substitution element has received information regarding entry into a sleep mode from the receiving element.

The substitution element can receive and record information sent by the sending element for the attention of the receiving element only after the substitution element has measured a predetermined duration after receipt of a last message received by the substitution element and sent by the receiving element.

The substitution element can be able to substitute itself for several receiving elements.

The substitution element can be designated from among the elements of the installation in the course of a prior designation procedure.

The substitution element can be determined in the course of a prior training procedure in which the reception level of a signal sent by the receiving element is measured in the various elements.

The signal can be sent at reduced power by the receiving element.

The signal reception sensitivity can be reduced in each element of the installation capable of becoming a substitution element.

The home-automation installation according to the invention comprises at least one sending element and a self-powered receiving element. It is characterized in that it comprises hardware and software means for implementing the communication method defined above.

BRIEF DESCRIPTION OF THE FIGURES

The appended drawing represents, by way of example, an embodiment of a home-automation installation according to the invention and modes of execution of a communication method according to the invention.

FIGS. 3 and 4 are timecharts of two variants of execution of the communication method.

FIG. 5 is a flowchart of a method of designating a substitution element according to the invention.

FIG. 6 is a flowchart of a method of training a substitution element according to the invention.

FIG. 7 is a timechart of another variant of execution of the communication method.

DETAILED DESCRIPTION

Figure 1:
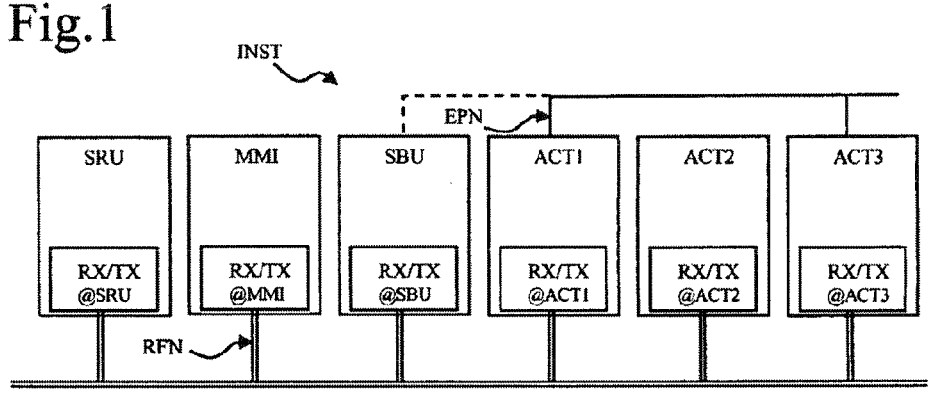
FIG. 1 is a diagram of an embodiment of an installation according to the invention.

In the home-automation installation INST represented in FIG. 1, various elements SRU, MMI, SBU, ACT1, ACT2, ACT3 communicate over one and the same radiofrequency network RFN, symbolized by a double line. Communication between elements is carried out by bidirectional transmitters RX/TX, differentiated by the address or identifier of each element. The installation comprises elements ACT1, ACT3 powered by the electrical network EPN, while other elements SRU, MMI, ACT2 are self-powered. Communication between the elements of the network can be ensured by other means, such as in particular infrared transmission means. The various elements use one and the same communication protocol.

A self-powered sensor, or sensor unit SRU, whose address is denoted @SRU, transforms the value of a climatic or comfort parameter into a digital quantity, and/or into control commands established on the basis of comparison thresholds.

A man-machine interface MMI housing, whose address is denoted @MMI, makes it possible to send user commands to the elements, or to display state messages. These two elements are energy self-powered. The man machine interface is for example a portable remote control, with keypad and screen.

A first actuator ACT1, whose address is denoted @ACT1, activates the maneuvering of a roller blind, door or gate. This first actuator is powered on the electrical network EPN.

A second actuator ACT2, whose address is denoted @ACT2, activates the maneuvering of an interior solar protection. This second actuator is self-powered.

A third actuator ACT3, whose address is denoted @ACT3, activates a lighting means. It comprises for example a dimmer and a fluorescent lamp. It is powered by the electrical network EPN.

The addresses, or identifiers, of each of the elements of the network are known to the whole set of other elements of the network with which they are likely to communicate. The recording of addresses or identifiers takes place during step of configuration or pairing proceedings known of a person skilled in the art. Thus, the actuators know the control units from which they may receive control commands.

All the elements of the home automation network RFN, and in particular the energy self-powered elements, use a same authentication key, called house-key, making it possible to recognize the membership of the home automation network.

The energy self-powered elements are powered by dry cell, alternatively by accumulator, supercapacitor, fuel cell, with a possible means for transforming nonelectrical energy into electrical energy, such as for example a photovoltaic sensor.

A particular element SBU of the installation is termed a "substitution element". This element is preferably powered on the electrical network EPN, as represented by a dashed line. As a variant, the substitution element is energy self-powered, but has much greater autonomy than the other self-powered elements for which the communication method of the invention is implemented. The address of the substitution element is denoted @SBU. It contains a memory MEM allowing the storage of information. Advantageously, the substitution element is itself contained in an actuator powered by the electrical network, but it may be a separate element whose only function is to allow the implementation of the communication method according to the invention.

The benefit of the method is that it allows the self-powered elements that are the destinations of information to enter sleep mode with a duty ratio (ratio between the durations of the awake phases and the durations of the sleep phases) of very small value. Conversely, the substitution element listens permanently, or operates at least with a sufficient duty ratio to guarantee receipt of any radio message.

Figure 2:
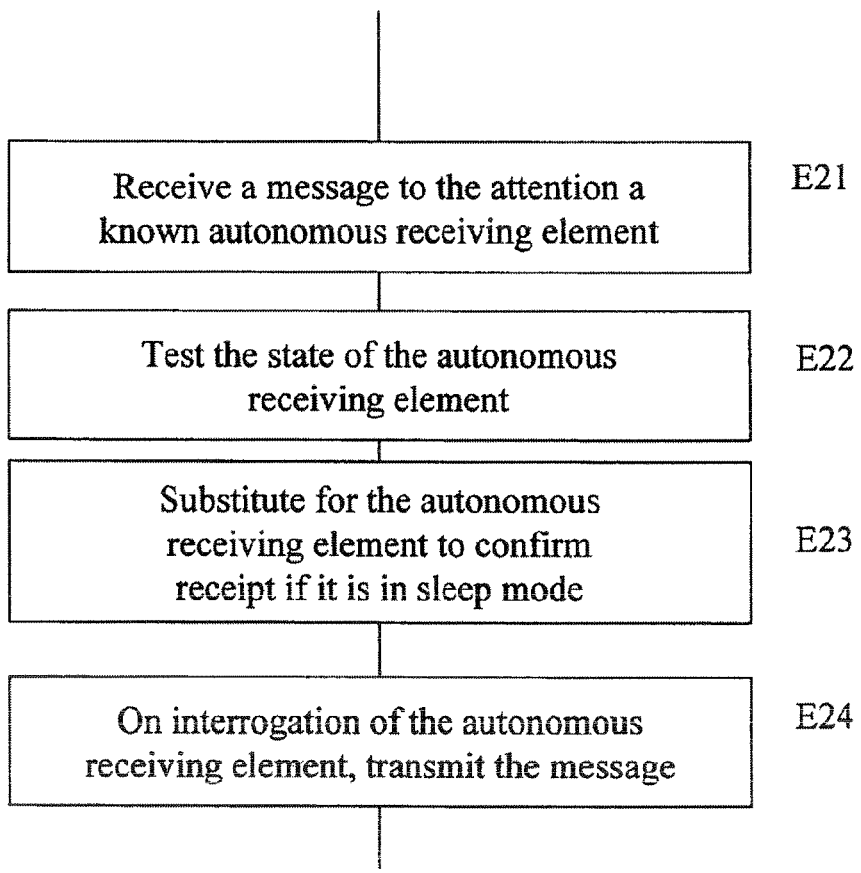
FIG. 2 is a flowchart of a mode of execution of a communication method according to the invention.

A mode of operation of the method is schematically represented in FIG. 2, where it is executed by the substitution element SBU.

In a first step E21, the substitution element receives information from a sending element which is not addressed to it, but which is destined for an self-powered receiving element known to the substitution element. Designation or learning methods which allow the substitution element to ascertain a self-powered receiving element (or the self-powered receiving elements) are described further on.

In a second step E22, the substitution element makes sure that the self-powered receiving element is in sleep mode. If this is not the case, the method loops to the initial radio listening phase. If on the other hand the substitution element determines that the self-powered receiving element is asleep, then a third step E23 is entered in which the substitution element stores the information in its memory MEM and acknowledges proper receipt of the information by sending a reception confirmation message for the attention of the sending element. The substitution element substitutes in this reception confirmation message the address of the receiving self-powered element for its own address. Thus, at this instant, for the sending element the information has been effectively transmitted to the receiving element.

Being interrogated by the self-powered receiving element, in a fourth step E24, the substitution element communicates to said element the information recorded in memory. The interrogation consists of a message specifically addressed by the self-powered receiving element. Alternatively, the interrogation consists of a broadcasted message, with no particular destination, by the self-powered receiving element whenever it wakes up.

FIG. 3 illustrates the application of the method by a first example of exchanges between elements, in timechart form, time proceeding from the top downwards.

The left vertical line designates a self-powered receiving element SAU which consists by way of example of one of the self-powered elements of the installation: the sensor SRU, the man-machine interface MMI or the second actuator ACT2. The right vertical line consists of the substitution element SBU. It is assumed that the substitution element has already ascertained the self-powered receiving element, and vice versa.

In an initial state, the self-powered receiving element SAU, for example previously awoken by its internal clock, or by a user action, or for any other reason, completes its activity. A first step E31 is then entered in which the receiving element informs the substitution element that it will enter sleep mode, this being represented by the message "SLP". On receipt of this message, the substitution element confirms receipt (confirmation not represented) and, in a second step E32 it toggles an internal indicator SLP to the high state so as to record the sleep situation of the self-powered receiving element.

For its part, the self-powered receiving element enters sleep mode, which state is represented by a double vertical line.

In a third step E33, a message MSG is addressed to the self-powered receiving element, originating from another element of the installation, termed the sending element and denoted XXX. This sending element XXX is arbitrary. It is for example the third actuator ACT3 which wants to signal to the self-powered receiving element (the portable remote control comprising the man-machine interface MMI) that a maneuver command has indeed been executed. Or else, the sending element XXX is the portable remote control which wants to indicate to the sensor SRU the values of its new reaction thresholds.

This message is not perceived by the self-powered receiving element which is in sleep mode, but it is picked up by the substitution element.

In a fourth step E34, the substitution element SBU tests the state of the internal indicator SLP. The latter being in the high state, the message MSG is recorded in the substitution element and a reception confirmation fifth step E35 is triggered. In the course of this step, the substitution element takes the identity of the receiving element, that is to say it indicates, in the reception confirmation message, the identifier or the address of the self-powered receiving element instead of its own address. The sending element then notes that there is proper reception and therefore completes the current send session, without there being any attempt to undertake multiple sends which would congest the network unnecessarily.

After the receiving element SAU wakes up (end of the double vertical line), a sixth step E36 is entered in which the receiving element informs the substitution element that it is active again, this being represented by the message "AWK". This has the effect of toggling the internal indicator SLP to the low state, in a seventh step E37, then of causing an eighth step E38 to be entered in which the message MSG, stored in the substitution element, is sent for the attention of the receiving element. In this step E38, the substitution element can substitute the identifier of the sending element for its own identifier. Thus, the communication method is transparent with respect to the receiving element, that is to say as far as it is concerned everything happens as if it had received the message MSG directly from the sending element.

In this first example, the second step E22 of the communication method is therefore performed by a test on the nature of a sleeping state communicated by the receiving element itself.

FIG. 4 constitutes a second example, in which step E22 of the communication method is carried out differently. This second embodiment is based on the detection of an absence of response to a message addressed to the self-powered receiving element. This absence of response is presumed to be related to the sleep mode of the self-powered element.

In a first step E41, a message MSG is addressed destined for the self-powered receiving element SAU, originating from another element of the installation, called a sending element and denoted XXX. At this instant, the receiving element is in a sleep mode, represented by a double vertical line. This message is not perceived by the receiving element, but it is picked up by the substitution element, which then triggers a timeout initialization second step E42. During this timeout, the substitution element tests whether there is any response from the self-powered receiving element, for example in the form of an acknowledgment of receipt. In a more general manner, the substitution element tests whether there is send activity on the part of the self-powered receiving element. This test forms the subject of a third step E43 which ends with the recording of the message MSG by the substitution element if no radio activity has been detected on the part of the self-powered receiving element for the timeout duration and it is concluded that it is in its sleep mode state. In this case, a reception confirmation fourth step E44 is entered. In the course of this step, the substitution element takes the identity of the receiving element, that is to say it indicates, in the reception confirmation, the identifier or the address of the self-powered receiving element instead of its own address.

The sending element then notes that there is proper reception and therefore completes the current send session, without there being any attempt to undertake multiple sends which would congest the network unnecessarily.

After the receiving element SAU wakes up or more generally returns to an operational mode (end of the double vertical line), a fifth step E45 is entered in which the receiving element informs the substitution element that it is active again, this being represented by the message "AWK". This has the effect of causing a sixth step E46 to be entered in which the message MSG, stored in the substitution element, is sent for the attention of the receiving element. In this step E46, the substitution element can substitute the identifier of the sending element for its own identifier. Thus, the communication method is transparent with respect to the receiving element, that is to say as far as it is concerned everything happens as if it had received the message MSG directly from the sending element.

In variant embodiments, the messages containing the sleep or awake state of the receiving element are sent by it according to a broadcast mode, indicating the sender of the message but not specifying any particular destination. Only the substitution element concerned then makes use thereof.

One and the same substitution element can substitute itself for several self-powered receiving elements, that is to say at least receive and record messages destned for several self-powered receiving elements, provided that it has knowledge thereof individually.

FIG. 5 describes a method of designating a substitution element. In a first step E51, a command to enter learning mode is sent to a chosen substitution element SBU, by action of a device on the latter. For example, the action may be the fact of plugging the substitution element SBU into an electrical socket linking it to the power supply network. The action may, if the substitution element is included in one of the actuators, be to send a specific programming signal from a remote control already paired with the actuator.

In a second step E52, there is action on the self-powered receiving element SAU (SRU, MMI, ACT2) so as to cause a radio signal to be sent containing the address of the receiving element. This action is for example a press of a key activating a contact in the self-powered receiving element.

In a third step E53, the address of the self-powered element @SAU is recorded by the substitution element and the latter sends a message indicating its own address @SBU to the self-powered receiving element. On completion of this third step, the substitution element has ascertained the self-powered receiving element for which it substitutes, and vice versa. However, it is not necessary for the substitution element to be known by the self-powered element.

FIG. 6 describes a method of configuring a substitution element. In a first step E61, there is action on the self-powered receiving element so as to cause a specific radio signal to be sent containing the address of the self-powered receiving element. This action is for example the pressing of a specific key activating a contact in the self-powered receiving element. This specific radio signal contains for example a specific command to enter training mode. Preferably, the specific radio signal is sent at reduced power.

In a second step E62, the signal is received by all the elements of the installation which are listening, and the non self-powered elements or those with high capacity power supply, which have also the necessary means to become a substitution element, are ranked according to the power of the signal received. The ranking can be carried out in the following manner: with a random duration after receipt of the signal, one of the elements talks and broadcasts on the radio network a message containing its identifier and the value of the level received. After this first broadcast, only the elements that received a level greater than this value are authorized to talk during a second broadcast of the value of the level received. Very rapidly, depending on the complexity of the installation, only the element that received the signal under the best conditions still remains. According to this method, this element then becomes the substitution element.

In a third step E63, a message containing the address of the substitution element is then sent to the receiving element, while the former records the address of the receiving element for which it substitutes. Alternatively, the receiving element which enters sleep mode after the send of the first step E61, is woken up after a predetermined timeout and broadcasts a signal to signal that it has woken up. Only the element (determined during the second step E62) that received the signal under the best conditions responds by communicating its address.

It emerges from the embodiments described that the substitution element absolutely must ascertain the identifier of the receiving element for which it substitutes. On the other hand, the reciprocal is not necessary: specifically, steps E36 of FIG. 3 and E45 of FIG. 4 of sending a signal by the receiving element to the substitution element may advantageously be replaced with broadcasting steps by the receiving element, without mentioning the element or the elements for which this signal is destined. In this case, the final phases of the third steps E53 and E63 are deleted. Moreover, as was previously seen in the description of steps E38 and E46, the receiving element can receive a message from the substitution element while considering the latter as coming from the sending element.

FIG. 7 constitutes a third example, in which step E22 of the communication method is carried out differently. This third embodiment is based on indications contained in the information sent by the sending element for the attention of the receiving element.

According to this embodiment, the sending element has knowledge about the state, active or in sleep mode, of the receiving element. Such knowledge may be obtained, for example, if the receiving element broadcasts an explicit message indicating its entry in sleep mode, or sends such a message to the sending element. Alternatively, an explicit "go to sleep mode" message may also be sent to the receiving element. Upon reception of such message, the receiving element may switch to a sleep mode.

According to this third embodiment, a message MSG sent by the sending element contains a particular field TB that enables the mechanism of receiving and recording of information by the substitution element. This field is contained in the message MSG, in addition to previously mentioned identifiers. It can be implemented as a simple flag TB.

When sending a message MSG, the sending element uses its prior knowledge of the receiving element power state. In the next example, we assume the receiving element SAU is in sleep mode.

In a first step E71, a message MSG is addressed to the receiving element SALT. The message includes a TB Flag at a particular level or state, for instance the ON state. The flag set to ON state in the message MSG means that the receiving element SAU is in sleep mode. In this case, the substitution element receives and records the information sent for the receiving element SAU.

Once the message has been processed by the substitution element, the substitution element generates an acknowledgement message to the sending element that the information has been properly received.

In this confirmation message the substitution element SBU is substituting an identifier of the receiving element for an identifier of the substitution element. The acknowledgement message is sent in step E72. It includes a FB Flag at a particular level or state, for instance set at the ON state. The flag set to ON state in the confirmation message means that the substitution element knows that the receiving element SAU is in sleep mode and therefore the substitution element has received and recorded the information sent for the attention of the receiving element.

In such a situation, the information sent from the sending element to the receiving element is not received by the receiving element but is received and recorded by the substitution element. The flag TB, when set, enables the mechanism of receiving and recording of information by the substitution element. The information is transmitted later when the receiving element is no more in sleep mode.

In another example, the receiving element is in active mode, and the sending element has knowledge of this state. In this case, in a step E73, a message MSG is addressed to the receiving element SAU and includes a TB Flag at a particular level or state, for instance set the flag at the OFF state. The flag set to OFF state in the message MSG means that the receiving element SAU is in active mode. Receiving and recording of the information by the substitution element is not enabled in this case.

Thus, in such a situation, the information sent from the sending element to the receiving element is received and acknowledged directly by the receiving element. In step 74, the confirmation message contains the FB flag set to OFF state.

In the present patent application the expression "sending element" is understood to mean an element sending any type of information (control command, data item, acknowledgment of receipt, etc.). The element is called a "sending element" once and for all in relation to information (for example an acknowledgment of receipt) even if it is also the destination of a control command from which the acknowledgment of receipt comes from.

In the present patent application the expression "receiving element" is understood to mean a receiving element of any type of information (control command, data item, acknowledgment of receipt, etc.). The element is called a "receiving element" once and for all in relation to information (for example a control command) even if it is also the sender of an acknowledgment of receipt in response to this control command.

The invention is particularly advantageous in the case where the installation comprises several self-powered sensors, and still more if the whole installation is actually driven by a self-powered element.

The programs allowing the operation of the communication method are preferably incorporated during manufacture into any device powered on the electrical network. Alternatively, such a program is downloadable onto one or more particular elements of the installation, once the latter has been completed.

In the present invention the various elements (sending element, receiving element and substitution element) belong to one and the same network and can thus communicate one with another using same protocol and means. Thus, the receiving element can communicate directly with the various other elements of the network when it is active, thereby limiting the traffic on the network. Moreover, the receiving element is usable in a simple network not comprising any substitution element. In this case, the messages sent by the receiving element would be received by the other elements which would be permanently active. On the other hand, the messages sent to the receiving element would have to be repeated until it wakes up. The resulting growth in traffic is supported by the fact that a simple network is involved.

The invention claimed is:

1. A communication method in a home-automation installation comprising at least one sending element, a self-powered receiving element, and an element for substituting for the receiving element, the sending element, the receiving element and the substitution element belonging to one and a same home-automation network such that the receiving element communicates directly with other elements of the home-automation network when the receiving element is active, the method being such that, when the receiving element is in a sleep mode, the substitution element executes the following steps:

receiving and recording information sent by the sending element for an attention of the receiving element only after the substitution element has received a message from the receiving element regarding entry of the receiving element into the sleep mode;

confirming to the sending element that the information has been received by substituting an identifier of the receiving element for an identifier of the substitution element, and such that, when the receiving element is no longer in sleep mode, the substitution element executes the following step:

sending the information for the receiving element, wherein the sending element, the receiving element and the substitution element use a same authentication key to recognize a membership of the home-automation network.

2. The communication method as claimed in claim 1, wherein, when the receiving element is not in sleep mode, the information is transmitted directly between the sending element and the receiving element.

3. The communication method as claimed in claim 1, wherein the substitution element is able to substitute itself for several receiving elements.

4. The communication method as claimed in claim 1, wherein the substitution element is designated from among the elements of the home-automation installation in a prior designation process.

5. The communication method as claimed in claim 1, wherein the substitution element is determined in a prior designation procedure in which a reception level of a signal sent by the receiving element is measured in elements of the home-automation installation to determine which element is the substitution element.

6. The communication method as claimed in claim 5, wherein the signal is sent at reduced power by the receiving element.

7. The communication method as claimed in claim 5, wherein a signal reception sensitivity is reduced in each element of the home-automation installation to determine the substitution element.

8. The communication method as claimed in claim 1, wherein the substitution element sends the information for the attention of the receiving element by substituting the identifier of the sending element for the identifier of the substitution element.

9. The communication method as claimed in claim 1, wherein the substitution element is able to substitute itself for several sending elements.

10. A home-automation installation apparatus comprising at least one sending element and a receiving element that is self-powered, the home-automation installation apparatus implementing a communication such that the receiving element communicates directly with other elements of the home-automation installation apparatus when the receiving element is active, the communication being such that, when the receiving element is in a sleep mode, a substitution element receives and records information sent by the sending element for the receiving element only after the submission element has received a message from the receiving element regarding its entry into the sleep mode and confirms to the sending element that the information has been received by substituting an identifier of the receiving element for an identifier of the substitution element, and such that, when the receiving element is no longer in sleep mode, the substitution element sends the information for the receiving element, wherein the sending element, the receiving element and the substitution element use a same authentication key to recognize the membership of the home-automation network installation apparatus.

11. A communication method in a home-automation installation comprising at least one sending element, a self-powered receiving element, and an element for substituting for the receiving element, the sending element, the receiving element and the substitution element belonging to one and a same home-automation network such that the receiving element communicates directly with other elements of the home-automation network when the receiving element is active, the method being such that, when the receiving element is in a sleep mode, the substitution element executes the following steps:

receiving and recording information sent by the sending element for an attention of the receiving element only if the information sent by the sending element contains an indication enabling receiving and recording information for the receiving element, and confirming to the sending element that the information has been received by substituting an identifier of the receiving element for an identifier of the substitution element, and such that, when the receiving element is no longer in the sleep mode, the substitution element executes the following step:

sending the information for the receiving element, wherein the sending element, the receiving element and the substitution element use a same authentication key to recognize a membership of the home-automation network.

12. The communication method as claimed in claim 11, wherein, when the receiving element is not in the sleep mode, the information is transmitted directly between the sending element and the receiving element.

13. The communication method as claimed in claim 11, wherein the substitution element is able to substitute itself for several receiving elements.

14. The communication method as claimed in claim 11, wherein the substitution element is designated from among the elements of the home-automation installation in a prior designation process.

15. The communication method as claimed in claim 11, wherein the substitution element is determined in a prior designation procedure in which a reception level of a signal sent by the receiving element is measured in elements of the home-automation installation to determine which element is the substitution element.

16. The communication method as claimed in claim 15 wherein the signal is sent at reduced power by the receiving element.

17. The communication method as claimed in claim 15, wherein a signal reception sensitivity is reduced in each element of the home-automation installation to determine the substitution element.

18. The communication method as claimed in claim 11, wherein the substitution element sends the information for the attention of the receiving element by substituting the identifier of the sending element for the identifier of the substitution element.

19. The communication method as claimed in claim 11, wherein the substitution element is able to substitute itself for several sending elements.

20. The communication method as claimed in claim 11, wherein the confirming step includes a confirmation message with an indication meaning that receiving and recording information for the receiving element was performed for that information.

21. A home-automation installation apparatus comprising at least one sending element and a receiving element that is self-powered, the home-automation installation apparatus implementing a communication such that the receiving element communicates directly with other elements of the home-automation installation apparatus when the receiving element is active, the communication being such that, when the receiving element is in a sleep mode, a substitution element receives and records information sent by the sending element for the receiving element only if the information sent by the sending element contains an indication enabling receiving and recording information for the receiving element and confirms to the sending element that the information has been received by substituting an identifier of the receiving element for an identifier of the substitution element, and such that, when the receiving element is no longer in the sleep mode, the substitution element sends the information for the receiving element, wherein the sending element, the receiving element and the substitution element use a same authentication key to recognize a membership of the home-automation network installation apparatus.

22. The home-automation installation apparatus as claimed in claim 21, wherein the substitution element generates in a confirmation message an indication that receiving and recording information for the receiving element was performed for that information.

* * * * *